United States Patent
Sugimoto

(10) Patent No.: US 11,591,938 B2
(45) Date of Patent: Feb. 28, 2023

(54) ENGINE CONTROL APPARATUS

(71) Applicant: TOYOTA JIDOSHA KABUSHIKI KAISHA, Toyota (JP)

(72) Inventor: Hitoki Sugimoto, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 17/685,449

(22) Filed: Mar. 3, 2022

(65) Prior Publication Data

US 2022/0316368 A1    Oct. 6, 2022

(30) Foreign Application Priority Data

Mar. 12, 2021    (JP) .................. 2021-040266

(51) Int. Cl.

| | | |
|---|---|---|
| F01L 1/34 | (2006.01) |
| F01L 9/20 | (2021.01) |
| F01L 13/08 | (2006.01) |
| F01L 1/344 | (2006.01) |
| F02D 13/02 | (2006.01) |
| F02D 41/06 | (2006.01) |
| F01L 9/40 | (2021.01) |

(52) U.S. Cl.
CPC .................. F01L 9/20 (2021.01); F01L 1/34 (2013.01); F01L 1/344 (2013.01); F01L 13/08 (2013.01); F02D 13/0234 (2013.01); F02D 13/0238 (2013.01); F02D 41/062 (2013.01); *F01L 2009/4084* (2021.01); *F01L 2760/001* (2013.01); *F01L 2800/01* (2013.01); *F02D 2200/021* (2013.01); *F02D 2200/50* (2013.01)

(58) Field of Classification Search
CPC ....... F01L 1/34; F01L 9/20; F01L 9/22; F01L 2009/4084; F01L 13/08; F01L 2760/001; F01L 2800/01; F02D 13/0223; F02D 13/0234; F02D 13/0238; F02D 41/064
USPC .................. 123/90.11, 90.15, 179.18, 182.1
See application file for complete search history.

(56) References Cited

U.S. PATENT DOCUMENTS

| 2007/0283933 A1* | 12/2007 | Magner ................. F02D 41/064 |
| | | 123/316 |
| 2008/0097685 A1* | 4/2008 | Nakamura .......... F02D 13/0207 |
| | | 701/113 |
| 2008/0257289 A1* | 10/2008 | Nakamura .......... F02D 13/0207 |
| | | 123/90.16 |

FOREIGN PATENT DOCUMENTS

| JP | 2006-299812 A | 11/2006 |
| JP | 2016-078803 A | 5/2016 |

* cited by examiner

*Primary Examiner* — Erick R Solis
(74) *Attorney, Agent, or Firm* — Finnegan, Henderson, Farabow, Garrett & Dunner, LLP

(57) ABSTRACT

If an engine coolant temperature is equal to or lower than a first low-temperature determination value and a battery temperature is equal to or lower than a second low-temperature determination value when a request to start up an engine is made, the advancement driving of a variable valve operating mechanism is first started. Then, when an advancement amount of the variable valve operating mechanism later becomes equal to or larger than a prescribed startup start determination value, is started.

4 Claims, 3 Drawing Sheets

ENGINE CONTROL APPARATUS

CROSS-REFERENCE TO RELATED APPLICATION

This application claims priority to Japanese Patent Application No. 2021-040266 filed on Mar. 12, 2021, incorporated herein by reference in its entirety.

BACKGROUND

1. Technical Field

The present disclosure relates to an engine control apparatus, and more specifically, to an improvement in a control structure regarding the enhancement of low-temperature startability of an engine that is equipped with a motorized variable valve operating mechanism.

2. Description of Related Art

There is an engine that is mounted in a vehicle or the like and that is equipped with a variable valve operating mechanism that makes the timing for closing an intake valve variable. In Japanese Unexamined Patent Application Publication No. 2006-299812 (JP 2006-299812 A), there is described an engine control apparatus that performs startup control of an engine that is equipped with such a variable valve operating mechanism. In the engine control apparatus described in this document, the variable valve operating mechanism is driven to a most retarded position in stopping the engine. The most retarded position mentioned herein means an operating position of the variable valve operating mechanism where the timing for closing the intake valve is most retarded within a variable range thereof. Moreover, with the engine control apparatus of this document, combustion is started with the operating position of the variable valve operating mechanism held coincident with the most retarded position, in starting up the engine with the temperature of the engine being high. Besides, with the engine control apparatus of this document, combustion is started after driving the variable valve operating mechanism toward an advancement side from the most retarded position after the start of cranking, in starting up the engine with the temperature of the engine being low. Incidentally, the cranking mentioned herein means rotating a crankshaft of the engine by an electric motor such as a starter motor.

Besides, in Japanese Unexamined Patent Application Publication No. 2016-078803 (JP 2016-078803 A), there is described an engine control apparatus that performs startup control of an engine that is mounted in a hybrid electric vehicle and that is equipped with a variable valve operating mechanism as mentioned above. The hybrid electric vehicle in this document is equipped with an electric motor as a drive source, in addition to the engine. Besides, in the hybrid electric vehicle, cranking is performed in starting up the engine, using the motive power generated by the electric motor. With the engine control apparatus of this document as well as the apparatus of JP 2006-299812 A, combustion is started after driving the variable valve operating mechanism toward an advancement side from a most advanced position after the start of cranking, in starting up the engine with the temperature of the engine being low. Furthermore, with the engine control apparatus of this document, the advancement amount of the operating position of the variable valve operating mechanism in this case is increased as the temperature of a battery falls.

SUMMARY

By the way, there is a motorized variable valve operating mechanism that operates by being fed with electric power from a battery, as the variable valve operating mechanism as described above. The driving of the motorized variable valve operating mechanism toward the advancement side at the time of low-temperature startup as described in the above-mentioned documents will now be considered. Under an extremely low temperature environment, the engine may be started up with both the engine and the battery at low temperature. When the temperature of the battery is low, the electric power feeding capacity of the battery falls. Then as a result, the operating speed of the variable valve operating mechanism may fall due to a deficiency in the amount of electric power that is fed. Therefore, under the extremely low temperature environment, it may be impossible to advance the operating position of the motorized variable valve operating mechanism to a position that is needed to ensure startability, before the start of combustion.

An engine that is designed to be controlled by an engine control apparatus that solves the aforementioned problem is equipped with a motorized variable valve operating mechanism that operates by being fed with electric power from a battery to make a timing for closing an intake valve variable. Besides, the engine is started up through cranking for rotating a crankshaft by external motive power. Moreover, the engine control apparatus performs startup control for starting the driving of the variable valve operating mechanism in such a direction as to advance the timing for closing the intake valve, prior to the start of the cranking, in starting up the engine.

In starting up the engine at low temperature, the startability of the engine deteriorates due to an increase in the amount of friction and a fall in volatility of fuel. In this case as well, it may be possible to ensure the startability of the engine by advancing the timing for closing the intake valve. On the other hand, when the temperature of the battery is low and hence the electric power feeding capacity of the battery has fallen, the operation of the variable valve operating mechanism may slow down due to a deficiency in the amount of electric power. Therefore, when the engine is started up with both the engine and the battery at low temperature, it takes a long time to advance the timing for closing the intake valve, so the completion of the startup of the engine may require some time. In this respect, the engine control apparatus starts driving the variable valve operating mechanism prior to the start of cranking. Therefore, even when the operating speed of the variable valve operating mechanism has fallen, cranking can be started with the timing for closing the intake valve advanced to some extent. Accordingly, the startability of the engine is restrained from deteriorating under a low-temperature environment.

Incidentally, the engine control apparatus is desired to start the cranking when it is confirmed that an operating amount of the variable valve operating mechanism in such a direction as to advance the timing for closing the intake valve has reached a prescribed amount, in the startup control. In this case, the timing for closing the intake valve in starting cranking is guaranteed to be advanced from a certain timing.

Incidentally, in performing the foregoing startup control, the start of cranking is retarded due to the driving of the variable valve operating mechanism. On the other hand, when both the engine and the battery are not at low temperature, the startability of the engine can be ensured even if the driving of the variable valve operating mechanism is not started prior to cranking. In consequence, the startup control is desired to be performed on the condition that the temperature of the engine is equal to or lower than a first temperature and the temperature of the battery is equal to or lower than a second temperature. That is, at least either when the temperature of the engine is higher than the first temperature or when the temperature of the battery is higher than the second temperature, the engine may be started up by starting the driving of the variable valve operating mechanism simultaneously with the start of cranking or after the start of cranking. Besides, it can be determined whether or not the startup control needs to be performed in this case, for example, as follows. That is, it is determined, based on a detection result of a coolant temperature sensor that detects a temperature of engine coolant, whether or not the temperature of the engine is equal to or lower than the first temperature, and it is determined, based on a detection result of a battery temperature sensor that detects the temperature of the battery, whether or not the temperature of the battery is equal to or lower than the second temperature.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
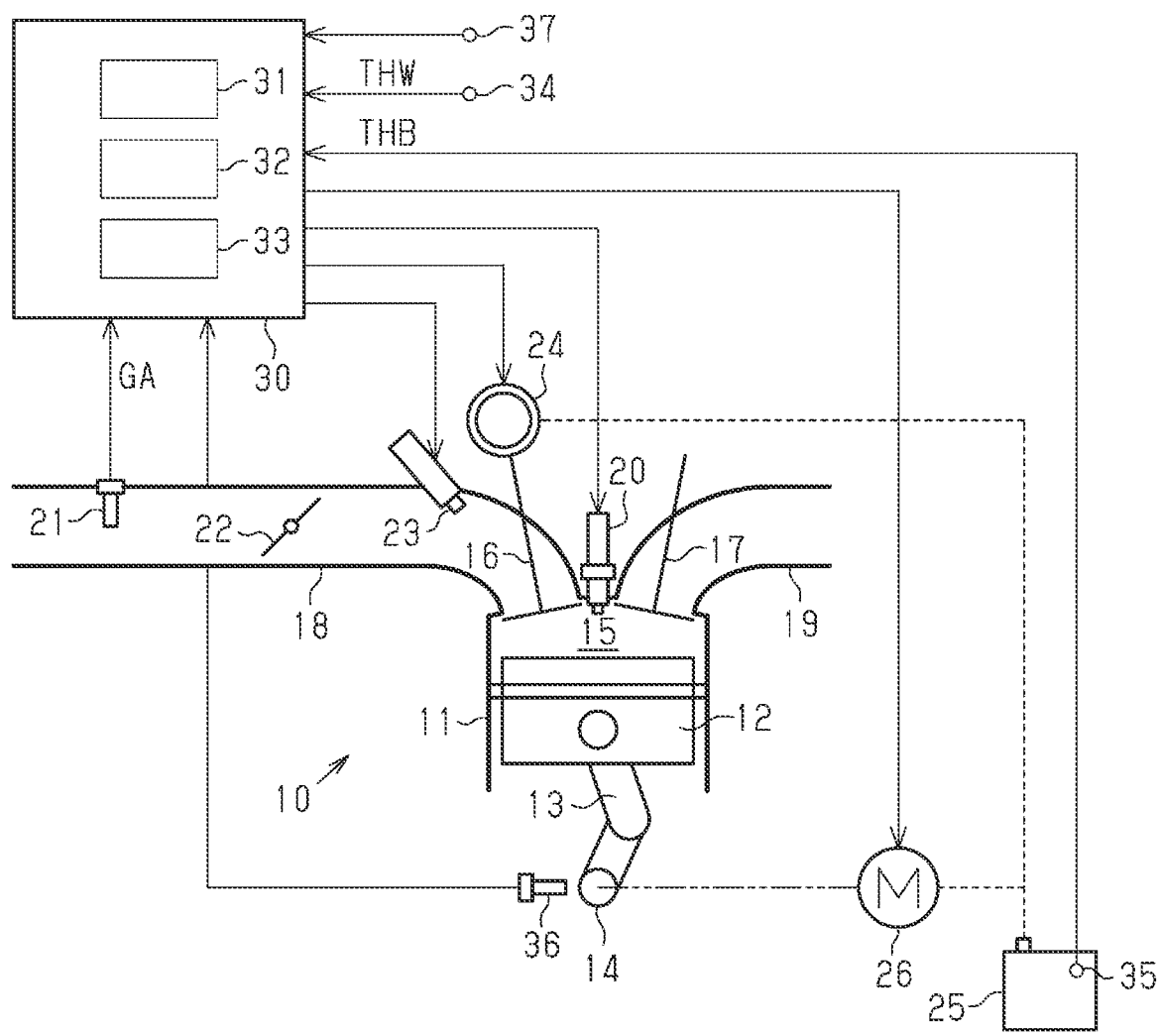
FIG. 1 is a view schematically showing the configuration of one of the embodiments of an engine control apparatus.

One of the embodiments of an engine control apparatus will be described hereinafter in detail with reference to FIGS. 1 to 3. Incidentally, an engine control apparatus 30 of the present embodiment is designed to control an engine 10 mounted in a vehicle.

(Configuration of Engine Control Apparatus 30)

First of all, the configuration of the engine control apparatus 30 of the present embodiment will be described with reference to FIG. 1. The engine 10 that is designed to be controlled by the engine control apparatus 30 of the present embodiment has a plurality of cylinders 11. Only one of the cylinders 11 is depicted in FIG. 1. A piston 12 is installed movably in a reciprocating manner in each of the cylinders 11. The piston 12 in each of the cylinders 11 is connected to a crankshaft 14 that is an engine output shaft, via a connecting rod 13. The connecting rod 13 converts reciprocating motion of the piston 12 into rotational motion, and transmits this rotational motion to the crankshaft 14.

In each of the cylinders 11, a combustion chamber 15 in which an air-fuel mixture is burned is defined by the piston 12. An intake valve 16 and an exhaust valve 17 are installed in the combustion chamber 15 of each of the cylinders 11. Moreover, the combustion chamber 15 is coupled to an intake passage 18 that is a passage for introducing intake air, via the intake valve 16. Besides, the combustion chamber 15 is coupled to an exhaust passage 19 that is a passage for discharging exhaust gas, via the exhaust valve 17. Both the intake valve 16 and the exhaust valve 17 are valves that open and close in response to rotation of the crankshaft 14. The combustion chamber 15 is brought into communication with the intake passage 18 as the intake valve 16 opens. Besides, the combustion chamber 15 is brought out of communication with the intake passage 18 as the intake valve 16 closes. On the other hand, the combustion chamber 15 is brought into communication with the exhaust passage 19 as the exhaust valve 17 opens. Besides, the combustion chamber 15 is brought out of communication with the exhaust passage 19 as the exhaust valve 17 closes. Furthermore, an ignition device 20 is installed in the combustion chamber 15 of each of the cylinders 11. The ignition device 20 ignites the air-fuel mixture introduced into the combustion chamber 15, through spark discharge.

An airflow meter 21, a throttle valve 22, and an injector 23 are installed in the intake passage 18. The airflow meter 21 is a sensor that detects an intake air flow rate GA in the intake passage 18. The throttle valve 22 is a valve that adjusts the intake air flow rate GA by changing the flow passage area of intake air. The injector 23 is a fuel injection device that injects fuel into intake air.

Furthermore, a variable valve operating mechanism 24 that makes the valve timing of the intake valve 16, namely, the timing for opening or closing the intake valve 16 variable is installed in the engine 10. The variable valve operating mechanism 24 is configured as a motorized mechanism that operates through the use of electric power supplied from a battery 25 mounted in the vehicle. Besides, an electric motor 26 is coupled to the crankshaft 14 of the battery 25. The electric motor 26 operates through the use of electric power supplied from the battery 25. A rotating force is then applied to the crankshaft 14 through the motive power that is generated by the electric motor 26 in the course of the operation thereof. In the following description, the application of the rotating force to the crankshaft 14 through the motive power of the electric motor 26 will be referred to as cranking. Incidentally, in the present embodiment, the motive power of the electric motor 26 serves as external motive power for rotating the crankshaft 14 in starting up the engine 10.

Incidentally, in the following description, an operating position where the valve timing of the intake valve 16 is most retarded within an operating range of the variable valve operating mechanism 24 will be referred to as a most retarded position. The timing for closing the intake valve 16 at the most retarded position is a timing more retarded than an intake bottom dead center. Besides, in the following description, an operating direction of the variable valve operating mechanism 24 in which the valve timing of the intake valve 16 is advanced will be referred to as an advancement direction. Furthermore, an operating direction of the variable valve operating mechanism 24 in which the valve timing of the intake valve 16 is retarded will be referred to as a retardation direction. Moreover, the operating position of the variable valve operating mechanism 24 will be represented by an advancement amount VT that is an operating amount in the advancement direction from the most retarded position.

The engine control apparatus 30 of the present embodiment is an electronic control unit that controls the engine 10 configured as described above. The engine control apparatus 30 is equipped with a computation processing unit 31, a read-only memory 32, and a readable/writable memory 33.

Besides, detection signals of various sensors provided at various portions of the vehicle are input to the engine control apparatus 30. The sensors from which the detection signals are input to the engine control apparatus 30 include a coolant temperature sensor 34, a battery temperature sensor 35, and a crank angle sensor 36 as well as the airflow meter 21. The coolant temperature sensor 34 is a sensor that detects an engine coolant temperature THW that is a temperature of engine coolant. The battery temperature sensor 35 is a sensor that detects a temperature of the battery 25. In the following description, the temperature of the battery 25 will be referred to as a battery temperature THB. The crank angle sensor 36 is a sensor that detects a crank angle that is a rotational angle of the crankshaft 14. Incidentally, the engine control apparatus 30 obtains a rotational speed of the crankshaft 14, namely, an engine rotational speed NE from a detection result of the crank angle sensor 36. Furthermore, a signal indicating a manipulation state of an ignition switch 37 that is a switch to be manipulated to start up and stop the engine 10 is input to the engine control apparatus 30. Besides, a signal indicating a current value of the advancement amount VT is input to the engine control apparatus 30 from the variable valve operating mechanism 24.

Programs and data for controlling the engine are stored in advance in the read-only memory 32 of the engine control apparatus 30. The computation processing unit 31 performs various processes regarding the control of the engine, by executing the programs read from the read-only memory 32. A computation result of the computation processing unit 31 and detection results of the sensors are temporarily stored in the readable/writable memory 33.

(Startup Control)

Subsequently, startup control that is performed by the engine control apparatus 30 when a request to start up the engine 10 is made by turning on the ignition switch 37 will be described. Incidentally, the engine control apparatus 30 performs stop control for the engine 10 when a request to stop the engine 10 is made by turning off the ignition switch 37. Moreover, in stop control, the engine control apparatus 30 drives the variable valve operating mechanism 24 to the most retarded position. In consequence, the advancement amount VT of the variable valve operating mechanism 24 is "0" when the request to start up the engine 10 is made.

Figure 2:
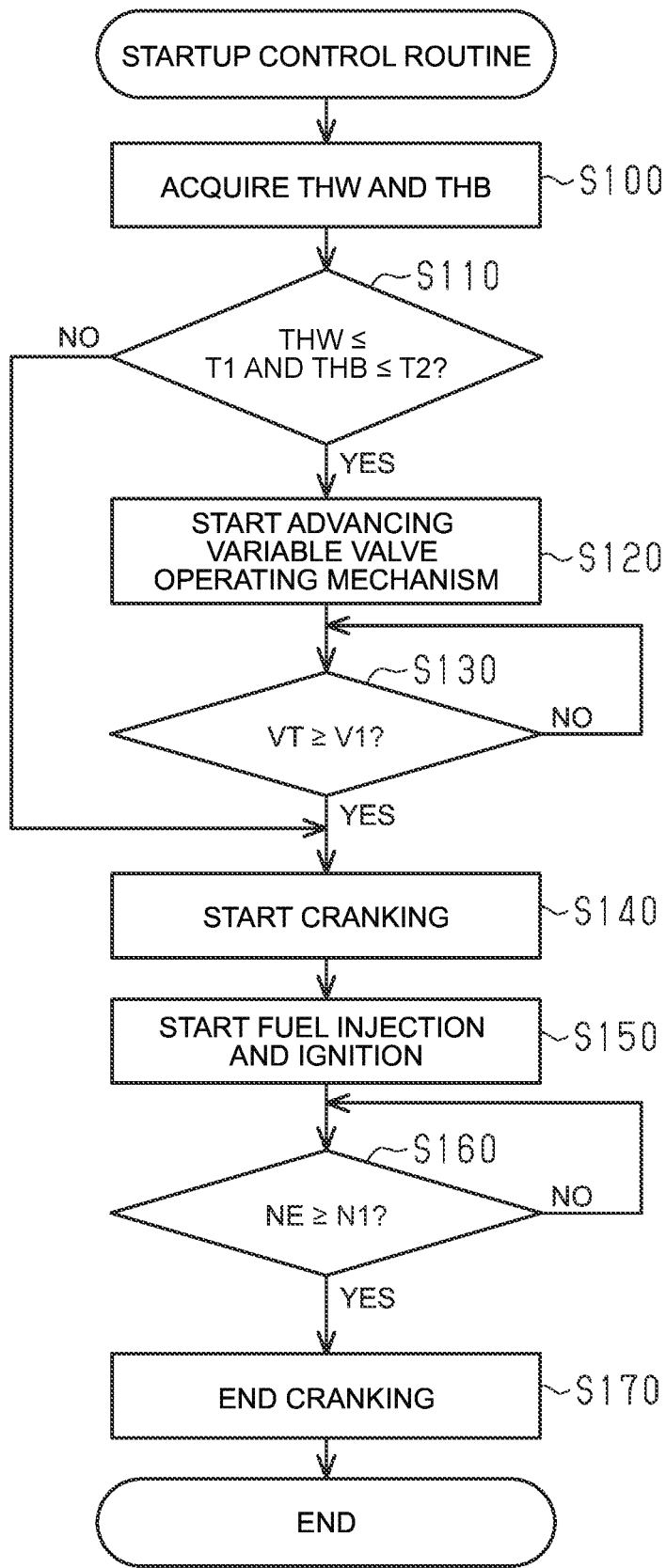
FIG. 2 is a flowchart of a startup control routine that is executed by the engine control apparatus.

FIG. 2 is a flowchart of a startup control routine that is executed by the engine control apparatus 30 in starting up the engine 10. The engine control apparatus 30 performs the process of the present routine when a request to start up the engine 10 is made by turning on the ignition switch 37. Incidentally, in the case where a prior process for verifying the operation of the sensors and the like is needed before beginning the startup of the engine 10, the process of the present routine may be started after the completion of the prior process.

When the present routine is started in response to the turning on of the ignition switch 37, the engine control apparatus 30 first acquires current values of the engine coolant temperature THW and the battery temperature THB in step S100. Then in step S110, the engine control apparatus 30 determines whether or not the engine coolant temperature THW is equal to or lower than a prescribed first low-temperature determination value T1 and the battery temperature THB is equal to or lower than a prescribed second low-temperature determination value T2. If the result of the determination in step S110 is positive (YES), the engine control apparatus 30 then advances the process to step S120.

If the result of the determination in step S110 is negative (NO), the engine control apparatus 30 then advances the process to step S140.

When the process is advanced to step S120, the engine control apparatus 30 starts driving the variable valve operating mechanism 24 in the advancement direction in step S120. In concrete terms, the engine control apparatus 30 changes the target value of the advancement amount VT from "0" to a prescribed low-temperature startup advancement amount V2. Incidentally, in the following description, the target value of the advancement amount VT of the variable valve operating mechanism 24 will be referred to as a target advancement amount, and an actual value of the advancement amount VT of the variable valve operating mechanism 24 will be referred to as an actual advancement amount. Besides, in the following description, the driving of the variable valve operating mechanism 24 in the advancement direction will be referred to as the advancement driving of the variable valve operating mechanism 24. After that, the engine control apparatus 30 waits for the actual advancement amount to become equal to or larger than a prescribed startup start determination value V1 (YES in step S130), and advances the process to step S140. A value that is larger than "0" and equal to or smaller than the low-temperature startup advancement amount V2 is set in advance as the startup start determination value V1.

When the process is advanced to step S140, the engine control apparatus 30 starts cranking, namely, the rotational driving of the crankshaft 14 by the electric motor 26 in step S140. When rotation of the crankshaft 14 is started, the engine control apparatus 30 starts fuel injection and ignition in subsequent step S150. Then, when the engine rotational speed NE becomes equal to or higher than a prescribed startup completion determination value N1 (YES in S160), the engine control apparatus 30 ends cranking in step S170 and then ends the process of the startup control routine.

Incidentally, in the present embodiment, the processing of steps S120 to S170 of FIG. 2 constitutes a process corresponding to low-temperature startup control. Besides, in the present embodiment, the first low-temperature determination value T1 corresponds to the first temperature, and the second low-temperature determination value T2 corresponds to the second temperature.

Operation and Effect of Embodiment

The operation and effect of the engine control apparatus 30 of the present embodiment will be described.

The engine 10 that is designed to be controlled by the engine control apparatus 30 of the present embodiment is equipped with the motorized variable valve operating mechanism 24 as described above. When the operating position of the variable valve operating mechanism 24 coincides with the most retarded position, the timing for closing the intake valve 16 is more retarded than the timing when the piston 12 is located at the intake bottom dead center. When the intake valve 16 remains open until a timing more retarded than the timing when the piston 12 reaches the intake bottom dead center, part of the intake air that has been sucked into the combustion chamber 15 until the piston 12 reaches the intake bottom dead center is blown back into the intake passage 18. Therefore, when the timing for closing the intake valve 16 is retarded from the timing when the piston 12 reaches the intake bottom dead center, the rate of filling the cylinder 11 with intake air falls.

In the following description, the startup of the engine 10 in the case where both the engine 10 and the battery 25 are at low temperature will be referred to as low-temperature startup, and the startup of the engine 10 will otherwise be referred to as normal startup. The engine control apparatus 30 at the time of normal startup starts cranking without performing the advancement driving of the variable valve operating mechanism 24. The advancement amount VT of the variable valve operating mechanism 24 is "0" when a request to start up the engine 10 is made, as described above. In consequence, at the time of normal startup, the engine 10 is started up with the operating position of the variable valve operating mechanism 24 coinciding with the most retarded position.

On the other hand, when the temperature of the engine 10 is low, the amount of friction resulting from an increase in viscosity of engine oil increases. Besides, a combustion torque becomes difficult to obtain due to a fall in volatility of fuel. Therefore, at the time of low-temperature startup, the startability of the engine 10 cannot be ensured if the operating position of the variable valve operating mechanism 24 is held coincident with the most retarded position. Besides, when the battery temperature THB is low, the maximum value of the instantaneous electric power that can be output by the battery 25 is small. Then as a result, the motive power of the electric motor 26 during cranking falls. Therefore, the startability of the engine 10 further deteriorates when the engine 10 and the battery 25 are at low temperature.

In contrast, according to the present embodiment, the engine 10 is started up according to a procedure different from that at the time of the foregoing normal startup, at the time of low-temperature startup. At the time of low-temperature startup, the variable valve operating mechanism 24 is driven to be advanced to the operating position where the advancement amount VT is the low-temperature startup advancement amount V2. Thus, the startability of the engine 10 at the time of low-temperature startup is restrained from deteriorating, by enhancing the rate of filling the cylinder 11 with intake air and enhancing the efficiency of burning fuel in the cylinder 11. Incidentally, the value of the advancement amount VT of the variable valve operating mechanism 24 that makes it possible to ensure the startability of the engine 10 is set as the low-temperature startup advancement amount V2, even when the engine coolant temperature THW is equal to or lower than the first low-temperature determination value T1.

A case where the advancement driving of the variable valve operating mechanism 24 to the operating position where the advancement amount VT is the low-temperature startup advancement amount V2 is started upon the start of cranking will now be considered. In this case as well, the startability of the engine 10 can be ensured as long as the advancement driving of the variable valve operating mechanism 24 can be completed in a sufficiently short time. On the other hand, the electric power feeding capacity of the battery 25 falls when the battery 25 is at low temperature. Then as a result, the operation of the variable valve operating mechanism 24 slows down due to a deficiency in the amount of electric power. Accordingly, when the temperature of the battery 25 is low, it may become impossible to ensure the startability of the engine 10 even if the advancement driving of the variable valve operating mechanism 24 is started simultaneously with cranking. Thus, in the present embodiment, the advancement driving of the variable valve operating mechanism 24 is started prior to the start of cranking, at the time of low-temperature startup when both the engine 10 and the battery 25 are at low temperature.

Figure 3:
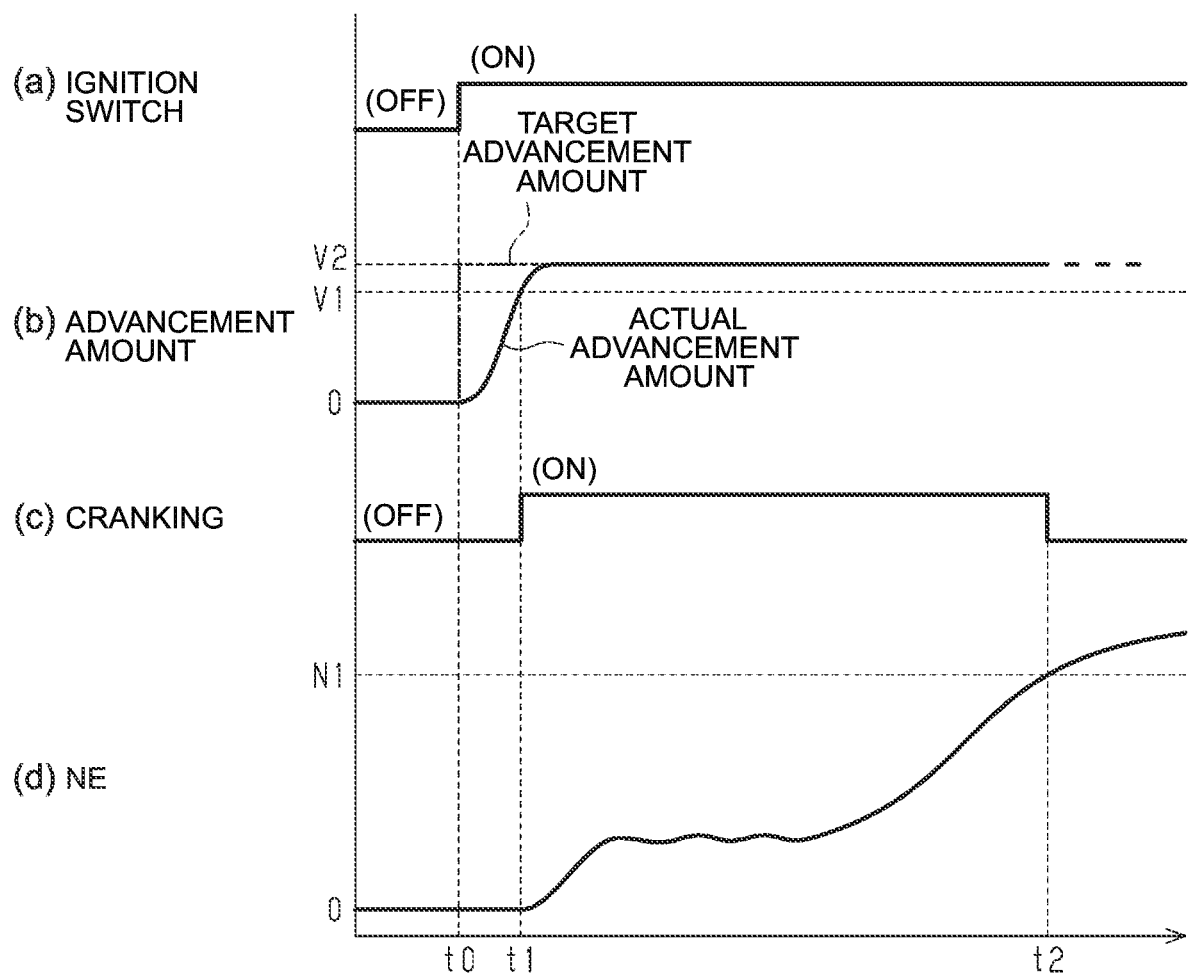
FIG. 3 includes time charts showing how the state of an ignition switch changes, how the target advancement amount and the actual advancement amount of a variable valve operating mechanism change, how the state of cranking changes, and how the rotational speed of an engine to which the engine control apparatus is applied changes respectively, when the engine is started up at low temperature.

FIG. 3 shows an example of a control mode of the engine control apparatus 30 of the present embodiment at the time of low-temperature startup. Incidentally, portion (a) shows how the manipulation state of the ignition switch 37 changes, portion (b) shows how the target advancement amount and actual advancement amount of the variable valve operating mechanism 24 change, portion (c) shows how the cranking state of the engine 10 changes, and portion (d) shows how the engine rotational speed NE changes.

In FIG. 3, the ignition switch 37 is turned on at a timing t0. In the case of low-temperature startup, the engine control apparatus 30 does not start cranking at the timing t0, and changes the target advancement amount of the variable valve operating mechanism 24 from "0" to the low-temperature startup advancement amount V2. Thus, in the present embodiment, the advancement driving of the variable valve operating mechanism 24 is started prior to the start of cranking, at the time of low-temperature startup. The actual advancement amount of the variable valve operating mechanism 24 reaches the startup start determination value V1 later at a timing t1. The engine control apparatus 30 starts cranking at the timing t1. After the start of cranking, fuel injection and ignition are started in the engine 10. The engine 10 assumes a complete explosion state later at a timing t2. When the engine rotational speed NE rises to the startup completion determination value N1, the engine control apparatus 30 ends cranking.

In this manner, according to the present embodiment, the advancement driving of the variable valve operating mechanism 24 is first started at the time of low-temperature startup. Then, when the actual advancement amount of the variable valve operating mechanism 24 reaches the startup start determination value V1, cranking is started. Therefore, the period from the start of cranking to the completion of startup is unlikely to become long even when the operating speed of the variable valve operating mechanism 24 has become low.

Incidentally, the startability is restrained from deteriorating due to an increase in the amount of friction and a fall in volatility of fuel at the time of low-temperature startup, by making the amount of fuel injection larger than at the time of normal startup as well. However, an attempt to ensure the startability at the time of low-temperature startup only by increasing the amount of fuel injection without performing the advancement driving of the variable valve operating mechanism 24 necessitates a substantial increase in the amount of fuel injection, and hence leads to a deterioration in fuel economy performance and exhaust emission performance of the engine 10. In contrast, when the advancement driving of the variable valve operating mechanism 24 is performed at the time of low-temperature startup, the startability can be ensured without substantially increasing the amount of fuel injection. Therefore, the fuel economy performance and exhaust emission performance of the engine 10 can be restrained from deteriorating at the time of low-temperature startup.

Incidentally, in the present embodiment, low-temperature startup control as described above is performed when the engine 10 is started up with the engine coolant temperature THW being equal to or lower than the first low-temperature determination value T1 and with the battery temperature THB being equal to or lower than the second low-temperature determination value T2. A lower limit of the engine coolant temperature THW that makes it possible to ensure the startability of the engine 10 with the operating position of the variable valve operating mechanism 24 being the most retarded position is set as the first low-temperature determination value T1. Besides, a lower limit of the battery temperature THB that makes it possible to obtain the operating speed of the variable valve operating mechanism 24 that is equal to or higher than a certain speed is set as the second low-temperature determination value T2.

The engine control apparatus 30 of the foregoing embodiment can exert the following effects.

(1) When the rate of filling the cylinder 11 with intake air is high, the compression reaction force of intake air in a compression stroke is large, so the amount of rotational fluctuations of the crankshaft 14 is large. Therefore, when the engine 10 is started up with the rate of filling the cylinder 11 with intake air being high, hammering noise of gears of a drive train and vibrations of a vehicle body are likely to occur due to rotational fluctuations of the crankshaft 14. In contrast, with the engine control apparatus 30 of the present embodiment, the engine 10 is started up with the operating position of the variable valve operating mechanism 24 being the most retarded position at the time of normal startup. Therefore, the engine 10 is started up with the rate of filling the cylinder 11 with intake air lowered at the time of normal startup, so the occurrence of hammering noise of the gears of the drive train and vibrations of the vehicle body is suppressed.

(2) The engine control apparatus 30 of the present embodiment starts up the engine 10 with the variable valve operating mechanism 24 driven to be advanced at the time of low-temperature startup. When the variable valve operating mechanism 24 is driven to be advanced from the most retarded position, the rate of filling the cylinder 11 with intake air becomes high, and the combustion efficiency of fuel is improved. Therefore, the startability of the engine 10 at the time of low-temperature startup is restrained from deteriorating.

(3) When the battery temperature THB is low, the operating speed of the variable valve operating mechanism 24 may fall due to an inability of the battery 25 to supply sufficient electric power. In the present embodiment, at the time of low-temperature startup, the advancement driving of the variable valve operating mechanism 24 is started prior to the start of cranking. Therefore, the period from the start of cranking to the completion of startup is unlikely to become long even when the battery temperature THB is low and the operating speed of the variable valve operating mechanism 24 is low.

(4) The variable valve operating mechanism 24 is driven to the most retarded position in stopping the engine 10. Therefore, the variable valve operating mechanism 24 does not need to be driven at the time of normal startup.

The present embodiment can be carried out after being modified as follows. The present embodiment and the following modification examples can be carried out in combination with one another within such a range that there is no technical contradiction.

In the foregoing embodiment, cranking is started when the advancement amount VT becomes equal to or larger than a startup start advancement amount V1, at the time of low-temperature startup. Instead of this, cranking may be started when the advancement amount VT reaches the low-temperature startup advancement amount V2. In this case, cranking is started upon the completion of the advancement driving of the variable valve operating mechanism 24 to the low-temperature startup advancement amount V2.

In the foregoing embodiment, the variable valve operating mechanism 24 is driven such that the operating position thereof coincides with the most retarded position, in stopping the engine 10. Moreover, while the engine 10 is started up with the operating position of the variable valve operating mechanism 24 held coincident with the most retarded position at the time of normal startup, the engine 10 is started up with the variable valve operating mechanism 24 driven in the advancement direction from the most retarded position at the time of low-temperature startup. In stopping the engine 10, the variable valve operating mechanism 24 may be driven to an operating position other than the most retarded position. In this case, at the time of low-temperature startup, the variable valve operating mechanism 24 is driven in the advancement direction from the operating position to which the variable valve operating mechanism 24 was driven in stopping the engine 10.

In the foregoing embodiment, it is determined, based on the engine coolant temperature THW, whether or not the temperature of the engine 10 is equal to or lower than the first temperature. However, this determination may be made based on another parameter indicating a temperature state of the engine 10, for example, a temperature of engine oil.

It may be determined, based on a soaking time and an outside air temperature, whether or not the temperature of the engine 10 is equal to or lower than the first temperature and the temperature of the battery 25 is equal to or lower than the second temperature. The soaking time is a time from stoppage of the engine 10 to re-startup of the engine 10. As the soaking time lengthens, the temperatures of the engine 10 and the battery 25 converge to a temperature close to the outside air temperature. In consequence, it can be determined that both the engine 10 and the battery 25 are at low temperature, on the grounds that the soaking time is equal to or longer than a certain time and that the outside air temperature is equal to or lower than a certain temperature. Incidentally, in this case, the certain temperature corresponds to the first temperature and the second temperature.

In the case where the battery 25 can also be regarded as being at low temperature when the engine 10 is at low temperature, the determination may be made in step S110 of FIG. 2 without using the battery temperature THB. That is, in the foregoing case, it may be determined that both the engine 10 and the battery 25 are at low temperature, on the grounds that the engine coolant temperature THW or the temperature of engine oil is equal to or lower than a certain temperature.

The maximum value of the instantaneous electric power that can be output by the battery 25 changes depending on the amount of electric power accumulated in the battery 25 as well. That is, the maximum value of the instantaneous electric power that can be output by the battery 25 under the condition that the battery temperature THB is constant decreases as the amount of electric power accumulated in the battery 25 decreases. Thus, the second low-temperature determination value T2 may be variably set in accordance with the amount of electric power accumulated in the battery 25. In concrete terms, a larger value may be set as the second low-temperature determination value T2 when the amount of electric power accumulated in the battery 25 is small than when the amount of electric power accumulated in the battery 25 is large.

As is the case with an engine mounted in a hybrid electric vehicle, electric power may be fed to the variable valve operating mechanism 24 and the electric motor 26 for cranking by separate batteries respectively. In the engine thus configured, it is determined whether or not low-temperature startup control is necessary, through the use of the temperature of the battery that feeds electric power to the variable valve operating mechanism 24.

Even when the engine 10 is at low temperature, the operating speed of the variable valve operating mechanism 24 does not fall unless the battery 25 is at low temperature.

Thus, in this case, the driving of the variable valve operating mechanism 24 may be started simultaneously with cranking or after the start of cranking.

Low-temperature startup control in the foregoing embodiment may be performed at the time of normal startup as well. In this case as well, the driving of the variable valve operating mechanism 24 is still started prior to the start of cranking when the engine 10 and the battery 25 are at low temperature. Thus, in this case as well, the startability of the engine 10 at low temperature is restrained from deteriorating.

What is claimed is:

1. An engine control apparatus designed to control an engine that is equipped with a motorized variable valve operating mechanism which operates by being fed with electric power from a battery to make a timing for closing an intake valve variable, and that is started up through cranking for rotating a crankshaft by external motive power, the engine control apparatus performing startup control for starting driving of the variable valve operating mechanism in such a direction as to advance the timing for closing the intake valve, prior to start of the cranking, in starting up the engine; and starting the cranking when it is confirmed that an operating amount of the variable valve operating mechanism in such a direction as to advance the timing for closing the intake valve has reached a prescribed amount, in the startup control.

2. An engine control apparatus designed to control an engine that is equipped with a motorized variable valve operating mechanism which operates by being fed with electric power from a battery to make a timing for closing an intake valve variable, and that is started up through cranking for rotating a crankshaft by external motive power, the engine control apparatus performing startup control for starting driving of the variable valve operating mechanism in such a direction as to advance the timing for closing the intake valve, prior to start of the cranking, in starting up the engine, wherein the startup control is performed on a condition that a temperature of the engine is equal to or lower than a first temperature and a temperature of the battery is equal to or lower than a second temperature when a request to start up the engine is made.

3. The engine control apparatus according to claim 2 that determines, based on a detection result of a coolant temperature sensor that detects a temperature of engine coolant, whether or not the temperature of the engine is equal to or lower than the first temperature, and that determines, based on a detection result of a battery temperature sensor that detects the temperature of the battery, whether or not the temperature of the battery is equal to or lower than the second temperature.

4. The engine control apparatus according to claim 1, wherein the prescribed amount is smaller than the target advancement amount.

\* \* \* \* \*